(12) United States Patent
Richter et al.

(10) Patent No.: US 8,749,918 B2
(45) Date of Patent: Jun. 10, 2014

(54) MAGNETIC RECORDING SYSTEM USING PERPENDICULAR EXCHANGE SPRING MEDIA AND RING HEADS

(75) Inventors: Hans J. Richter, Palo Alto, CA (US); Petrus A. Van Der Heijden, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 104 days.

(21) Appl. No.: 12/977,025

(22) Filed: Dec. 22, 2010

(65) Prior Publication Data
US 2012/0162822 A1 Jun. 28, 2012

(51) Int. Cl.
*G11B 5/127* (2006.01)

(52) U.S. Cl.
USPC ............. 360/125.01; 360/125.16; 360/125.17

(58) Field of Classification Search
USPC ............. 360/125.02, 125.16, 125.19–125.21, 360/125.23, 125.25, 125.2, 125.22, 131, 360/125.04, 125.17
See application file for complete search history.

(56) References Cited

U.S. PATENT DOCUMENTS

| | | | |
|---|---|---|---|
| 6,594,122 B1 * | 7/2003 | Shukh | ........................... 360/317 |
| 6,816,339 B1 | 11/2004 | Litvinov et al. | |
| 7,075,756 B1 | 7/2006 | Mallary et al. | |
| 7,588,841 B2 | 9/2009 | Berger et al. | |
| 7,638,210 B2 | 12/2009 | Berger et al. | |
| 2004/0043258 A1 * | 3/2004 | Yamamoto et al. | .... 428/694 TM |
| 2005/0141137 A1 | 6/2005 | Okada et al. | |
| 2006/0188753 A1 * | 8/2006 | Lee et al. | ........................ 428/827 |
| 2007/0254189 A1 | 11/2007 | Nakagawa et al. | |
| 2008/0297951 A1 * | 12/2008 | Yamashita et al. | ............. 360/314 |
| 2009/0190256 A1 * | 7/2009 | Schabes et al. | ................ 360/121 |
| 2010/0128391 A1 | 5/2010 | Berger et al. | |

OTHER PUBLICATIONS

D. Seuss, et al. "Exchange-coupled Perpendicular Media," Journal of Magnetism and Magnetic Materials. Retrieved Jul. 2, 2010 from www.sciencedirect.com/science website, 3 pages.
B.J. Kirby, et al. "Direct Observation of Magnetic Gradient in Co/Pd Pressure-Graded Media," Journal of Applied Physics, 105, 07C929 (2009).
R.H. Victora, et al. "Exchange Coupled Composite Media," retrieved from http://static.msi.umn.edu/rreports/2007/182.pdf, pp. 1-9.
D. Seuss, et al. "Optimization of Exchange Spring Perpendicular Recording Media," IEEE Transactions on Magnetics, vol. 41, No. 10 (Oct. 2005), pp. 3166-3168.
Roger Wood, et al. "Perpendicular Magnetic Recording Technology," Hitachi www.hitachiGST.com (2007), 4 pages.
S. Khizroev, et al. "Perpendicular Magnetic Recording: Writing Process," Journal of Applied Physics, vol. 95, No. 9, May 1, 2004, pp. 4521-4537.

* cited by examiner

*Primary Examiner* — Wayne Young
*Assistant Examiner* — Carlos E Garcia
(74) *Attorney, Agent, or Firm* — Patterson & Sheridan, LLP

(57) ABSTRACT

The present invention generally relates to a magnetic recording system that utilizes perpendicular exchange spring media and ring heads. The write field of ring heads does not experience a strong loss as compared to pole heads because the pole can be kept long in the direction perpendicular to the recording medium and thus does not result in unfavorable write field scaling.

18 Claims, 8 Drawing Sheets

MAGNETIC RECORDING SYSTEM USING PERPENDICULAR EXCHANGE SPRING MEDIA AND RING HEADS

BACKGROUND OF THE INVENTION

1. Field of the Invention

Embodiments of the present invention generally relate to a magnetic recording system that utilizes perpendicular exchange spring media and ring heads.

2. Description of the Related Art

The state of the art technology for high-density magnetic recording is perpendicular recording. Modern heads use shielded heads where the shields serve to increase the field gradient, especially in the down track direction. Modern media are of the "exchange-spring" type, where each grain is composed of several sub-grains with different magnetic properties. The exchange spring or exchange coupled composite (ECC) media reduces the required switching field to write the media and has been considered a viable path to further decrease grain size and thus increase areal density.

It has become increasingly difficult to achieve good write performance for high density systems because the lack of scaling of the recording system leads to lower write fields and poorer field focusing. Scaling has become increasingly difficult because the medium thickness cannot be reduced due to the thermal stability constraints, and it is very challenging to further decrease the head medium separation.

SUMMARY OF THE INVENTION

The present invention generally relates to a magnetic recording system that utilizes perpendicular exchange spring media and ring heads. The write field of ring heads does not experience a strong loss as compared to pole heads because the pole can be kept long in the direction perpendicular to the recording medium and thus does not result in unfavorable write field scaling.

In one embodiment, a magnetic recording system includes a perpendicular exchange spring media and a ring head having an air bearing surface.

In another embodiment, a magnetic recording system includes a perpendicular exchange spring media and a ring head having an air bearing surface. The perpendicular exchange spring media comprises a substrate, a first magnetic layer disposed over the substrate, a coupling layer disposed on the first magnetic layer, a second magnetic layer disposed on the first coupling layer, and an overcoat layer disposed on the second magnetic layer.

In another embodiment, a magnetic recording system includes a perpendicular graded exchange spring media and a ring head having an air bearing surface. The ring head includes a leading pole tip and a trailing pole tip, wherein the trailing pole tip is slanted relative to the air bearing surface of the ring head.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a magnetic recording system that utilizes perpendicular exchange spring media and ring heads. The write field of ring heads does not experience a strong loss as compared to pole heads because the pole can be kept long in the direction perpendicular to the recording medium and thus does not result in unfavorable write field scaling.

It is important to analyze the writing process using the concept of a correctly defined effective field. The effective field takes into account that the magnetization structure within each grain is far from uniform during the write process. The head field stresses the spin chain and eventually causes the grain to switch.

Figure 1A:
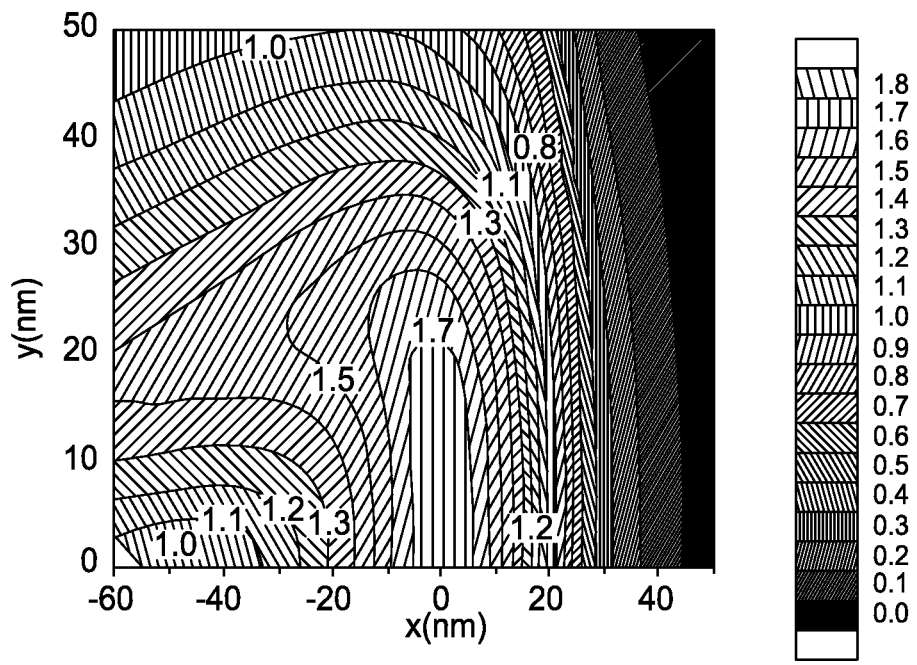
FIG. 1A is a graph showing the effective field map for a FEM head and allowing for incoherent magnetization reversal in an ECC medium.
Figure 1B:
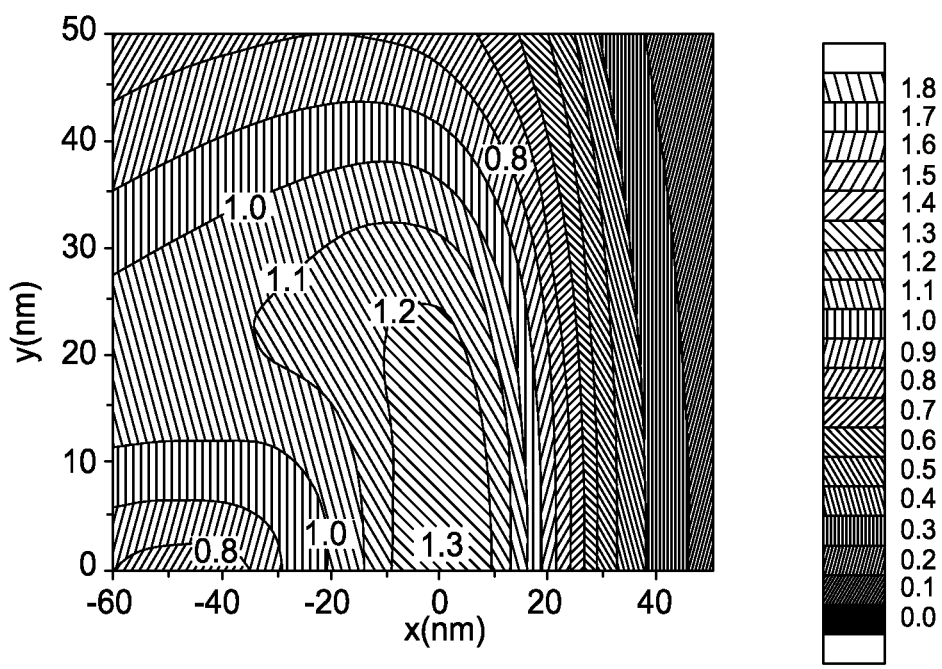
FIG. 1B is a graph showing the effective field map for a FEM head using volume averaging and assuming coherent magnetization reversal.

As an example, consider a map of the effective field for a graded exchange-spring type medium having a FEM field for the head field. FIG. 1A shows a field map where the contours represent lines of constant writability. More specifically, FIG. 1A shows the effective field map for a FEM head considering inhomogeneous magnetization reversal of a grain with 3 subgrains. The x axis represents the down track direction and the y axis represents the cross-track direction. For comparison, FIG. 1B shows an effective field map where the head field is volume averaged throughout the grain. In FIGS. 1A and 1B, the parameters are as follows: $\mu 0HA1=1.5T$; $HA2/HA1=0.75$; $HA3/HA1=0.5$; $\delta 1, 2, 3=6, 6, 6$ nm; Ms 1, 2, $3=500$ kA/m; HMS=10 nm; $\delta EBL=23$ nm (HKS=51) for shielded head; $J12=J23=1$ mJ/m$^2$; and 3-layer medium with layer 1 on bottom and layer 3 on top. Thus, the anisotropy grading for FIGS. 1A and 1B is 100 percent, 75 percent, and 50 percent. Clearly, the exchange spring mechanism considerably helps to write the media. An analysis of the switching mechanism shows that the inhomogenity of the write field makes a large contribution to the enhancement of the writability.

Figure 2:
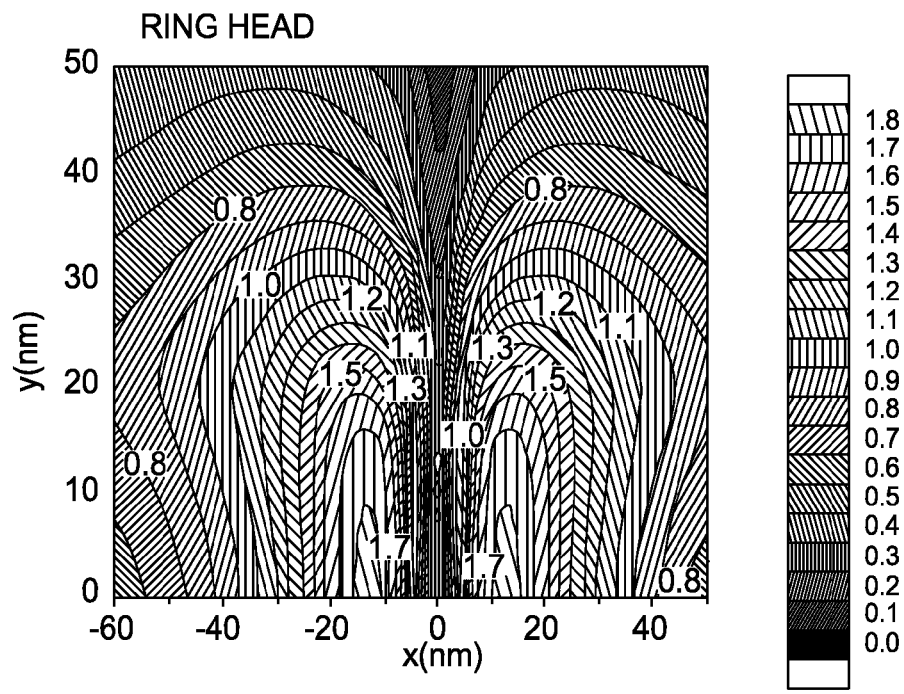
FIG. 2 is a graph showing the effective field map for a ring head allowing for incoherent magnetization reversal.
Figure 3:
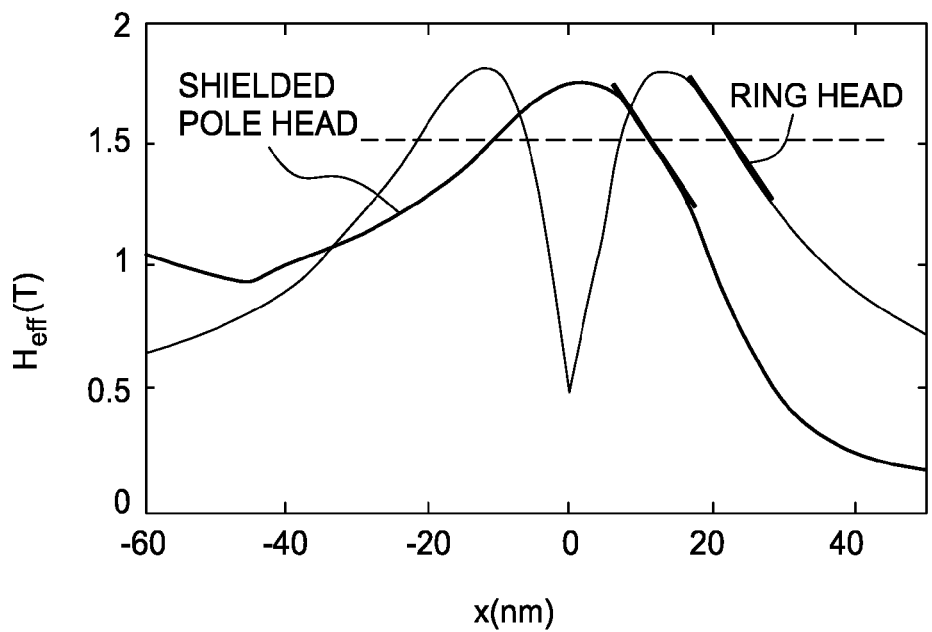
FIG. 3 is a graph showing the comparison of the effective fields for a ring head versus a shielded pole head.

Ring heads have very inhomogeneous fields and therefore the combination of a ring head with ECC is favorable. FIG. 2 shows an effective field map for an ideal ring head with a gap length of 26 nm and a pole width of 40 nm for the same medium used for FIGS. 1A and 1B. The fields were calculated assuming a material with $\mu oMs=2.4T$ (CoFe) and a 3D generalization of a Karlqvist type head. In accordance with basic theory, the deep gap field was taken to be 0.83*2.4T. FIG. 3 is a comparison of the effective fields of the ring head with that of the shielded pole head on the track center to demonstrate the similar maximum fields and field gradients.

Figures 4A, 4B, 4C:
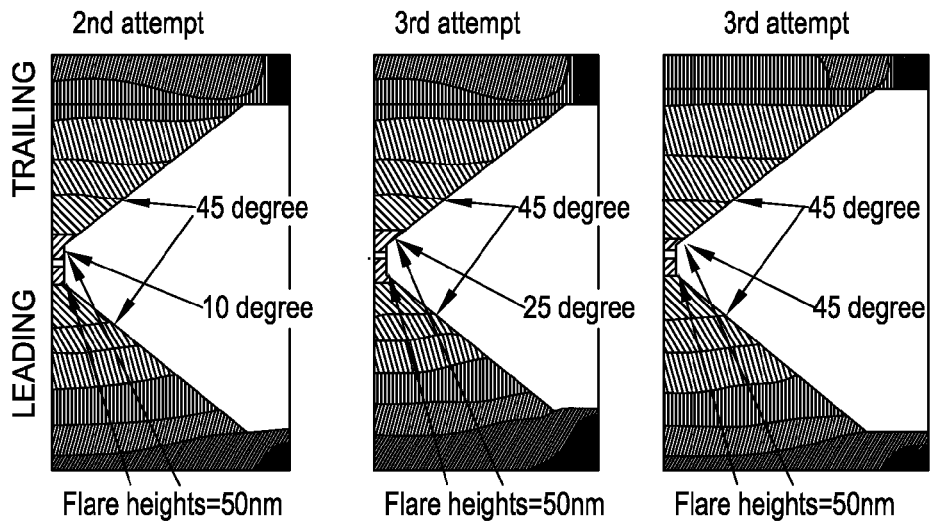
FIGS. 4A-4C are additional head structures used to calculate FEM fields.
Figure 5:
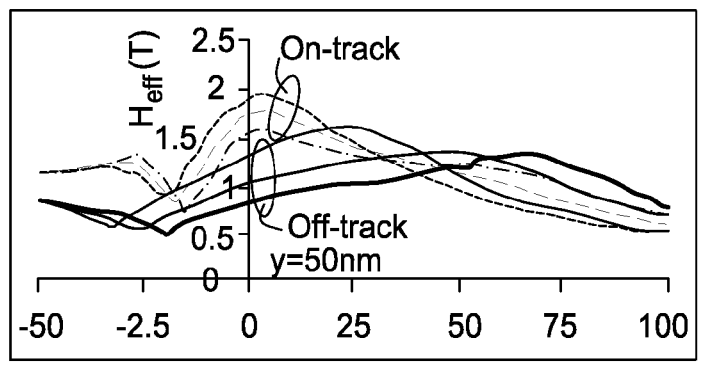
FIG. 5 is a graph showing the effective fields including the ECC effect for a low current.
Figure 6:
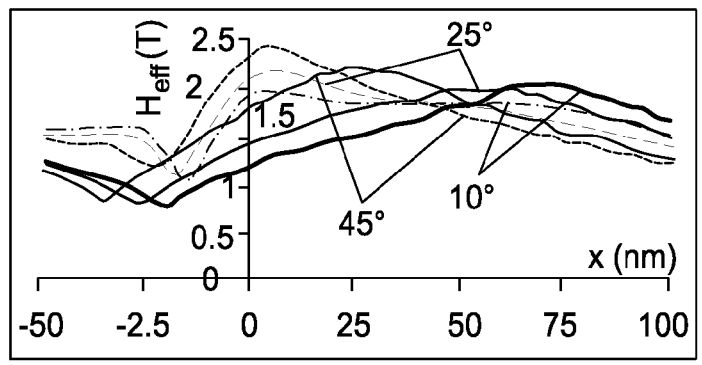
FIG. 6 is a graph showing the effective fields including the ECC effect for a high current.

A more comprehensive analysis was performed using FEM fields for the ring head as opposed to the idealized field mentioned above. It is surprising to discover that the fields created by the gap region itself are close to what is obtained with the idealized head. Additionally, ring heads can create high effective fields so that scaling works favorably for ring heads. Grading the media helps as the grading does for standard perpendicular recording. The tracks become narrower and the effective gradient is increased as a consequence of the grading. The optimum grading is different from what it is for recording with a shielded pole head. The weak point for the ring head/ECC medium system is to get the flux to the gap region without creating detrimental stray fields. These stray fields lead to very wide tracks. Examples of FEM head structures are shown in FIGS. 4A-4C. FIGS. 5 and 6 show the effective fields including the ECC effect for a non-saturated (20 mA) and a saturated case (40 mA). In FIGS. 5 and 6, the parameters are as follows: $\mu 0HA1=1.8T$; $HA2/HA1=0.8$; $HA3/HA1-0.6$; $\delta 1, 2, 3=6, 6, 6$ nm; Ms 1, 2, $3=500$ kA/m; HMS=10 nm; $J12=J23=2$ mJ/m$^2$; and 3-layer medium with layer 1 on bottom and layer 3 on top. Thus, the grading for FIGS. 5 and 6 is 100 percent, 80 percent, and 60 percent. Different flare angles move the saturation point around so that the maximum track width occurs at different locations. Although the ECC media help the performance, they cannot deal with the extensive fields created by the head structure.

Figure 7:
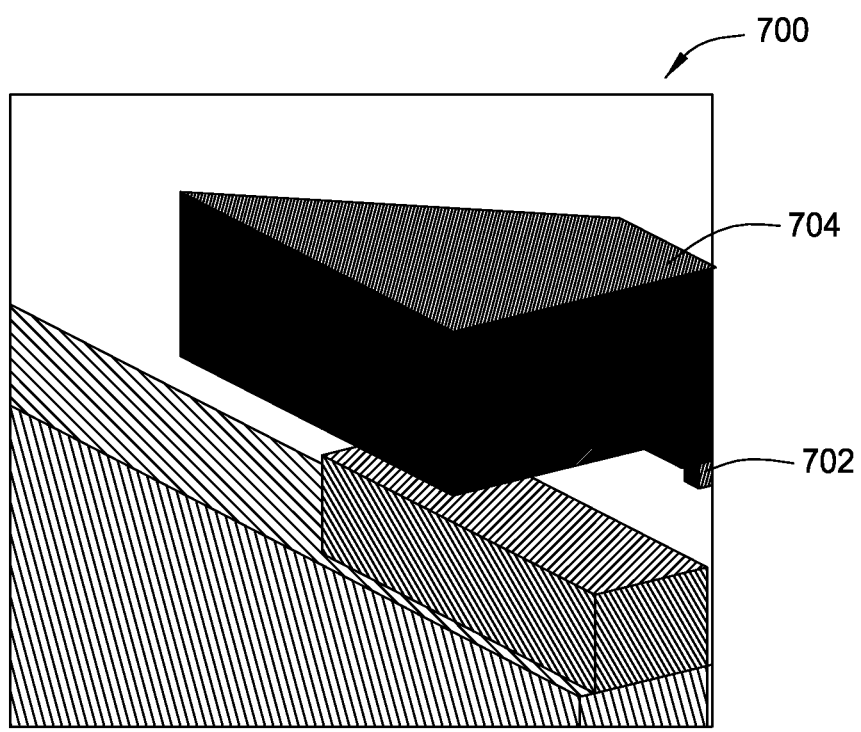
FIG. 7 is an isometric illustration of a ring head.

A better solution is shown in FIG. 7. FIG. 7 shows a head structure 700 for with shows strongly reduced secondary fields. Head structure 700 includes a magnetic pole tip 702 coupled to a top yoke 704. Another solution is head structures in which the magnetic material close to the air bearing surface (ABS) is confined to the gap region itself with yoke structures coming in at angles without using traditional stitched poles.

Figure 8A:
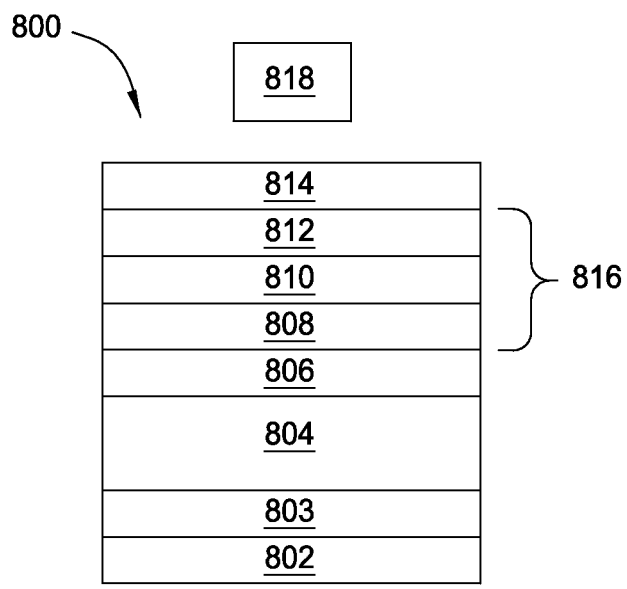
FIG. 8A is a cross-sectional view of a perpendicular magnetic recording medium used with a shielded pole head.

FIG. 8A is a cross-sectional view of a perpendicular magnetic recording medium 800 used with a shielded pole head 818. The perpendicular magnetic recording medium 800 is shown with a shielded pole head 818 disposed adjacent thereto. The perpendicular magnetic recording medium 800 includes a substrate 802. Suitable materials for the substrate include glass, aluminum alloy with a NiP coating, silicon, or silicon carbide. An adhesion layer 803 is disposed on the substrate 802. Suitable materials that may be utilized for the adhesion layer 803 include NiTa AlTi alloy or a similar material having a thickness of between about 2 nm to about 8 nm. A soft underlayer 804 is disposed on the adhesion layer 803. Suitable materials that may be utilized for the soft underlayer 804 include magnetically permeable materials such as alloys of CoNiFe, FeCoB, CoCuFe, NiFe, FeAlSi, FeTaN, FeN, FeTaC, CoTaZr, CoFeTaZr, and CoZrNb. The soft underlayer 804 may comprise a single layer or multiple layers of magnetic films separated by non-magnetic films.

An exchange break layer 806 may be disposed on the soft underlayer 804. The exchange break layer 806 acts to break the magnetic coupling between the magnetically permeable films of the soft underlayer 804 and the recording layer 816. Suitable materials for the exchange break layer 806 include nonmagnetic materials such as Ru, RuCr, NiW, RuTi, NiFeCr, CoFeTa, CrTa, MgO metals such as titanium, chromium, ruthenium, tungsten, zirconium, niobium, molybdenum, vanadium, and aluminum; metal alloys such as CrTi and NiP; and oxides, nitrides or carbides of an element selected from the group consisting of Si, Al, Zr, Ti, and B.

A first magnetic layer 808 is disposed on the exchange break layer 806. A coupling layer 810 is disposed on the first magnetic layer 808, and a second magnetic layer 812 is disposed on the coupling layer 810. The first magnetic layer 808, the coupling layer 810, and the second magnetic layer 812 collectively comprise the ECC recording layer 816. Suitable materials that may be utilized for the first magnetic layer 808 and second magnetic layer 812 include a layer of granular polycrystalline cobalt alloy such as CoPt or CoPtCr, with a suitable segregant such as oxides of Si, Ta, Ti, Nb, Cr, V, and B; multilayers with perpendicular magnetic anisotropy such as Co/Pt, Co/Pd, Fe/Pt, and Fe/Pd which may or may not contain a suitable segregant. The first magnetic layer 808 and the second magnetic layer 812 may have different magnetic properties such as different anisotropy fields. Suitable materials that may be used for the coupling layer 810 include NiCr based alloys, RuCr based alloys, CoCr based alloys, or CoCrB based alloys. A protective overcoat layer 814 is disposed on the second magnetic layer 812. Suitable materials for the protective overcoat layer 814 include amorphous diamond-like carbon (DLC) or silicon nitride.

Figure 8B:
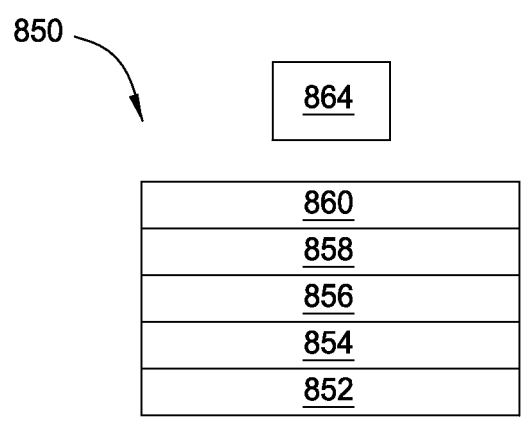
FIG. 8B is a cross-sectional view of a perpendicular magnetic recording medium used with a ring head.

When a ring head is utilized, the perpendicular magnetic recording medium need not have the soft underlayer. FIG. 8B is a cross-sectional view of a perpendicular magnetic recording medium 850 used with a ring head 864. The perpendicular magnetic recording medium 850 is shown with a ring head 864 disposed adjacent thereto. The perpendicular magnetic recording medium 850 includes a substrate 852, a first magnetic layer 854, a coupling layer 856, a second magnetic layer 858, and a protective overcoat layer 860. Suitable materials that may be used for the substrate 852, the first magnetic layer 854, the coupling layer 856, the second magnetic layer 858, and the protective overcoat layer 860 are discussed above with reference to FIG. 8A. As one can easily see, the perpendicular magnetic recording medium 850 does not have a soft underlayer. Thus, the chambers that are typically utilized to form the soft underlayer or the adhesion layer may be reprogrammed for other processes and therefore increase efficiency of the fab where the perpendicular magnetic recording medium 850 is manufactured.

Figure 9A:
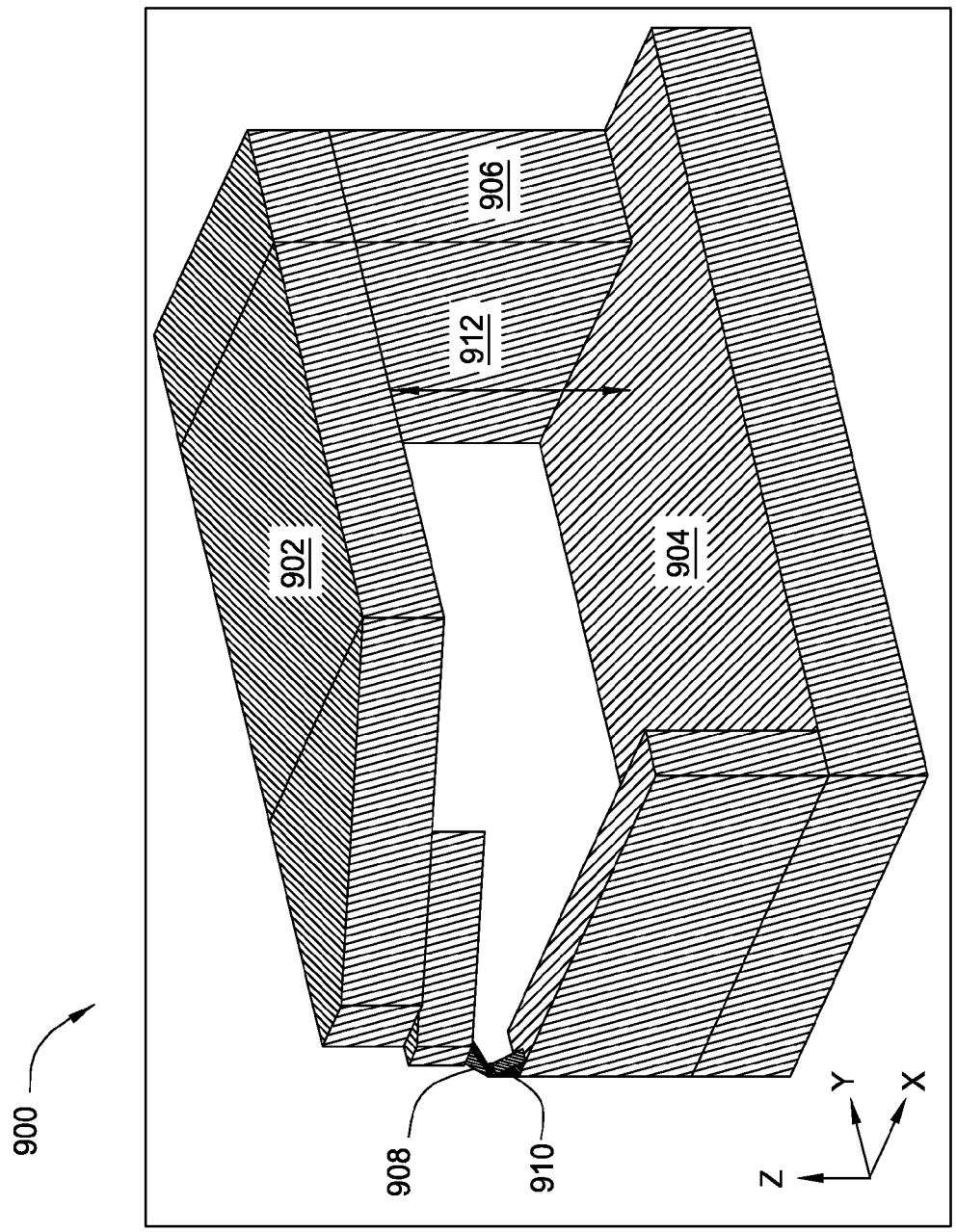
FIGS. 9A-9C are isometric views of a ring head according to one embodiment.
Figure 9B:
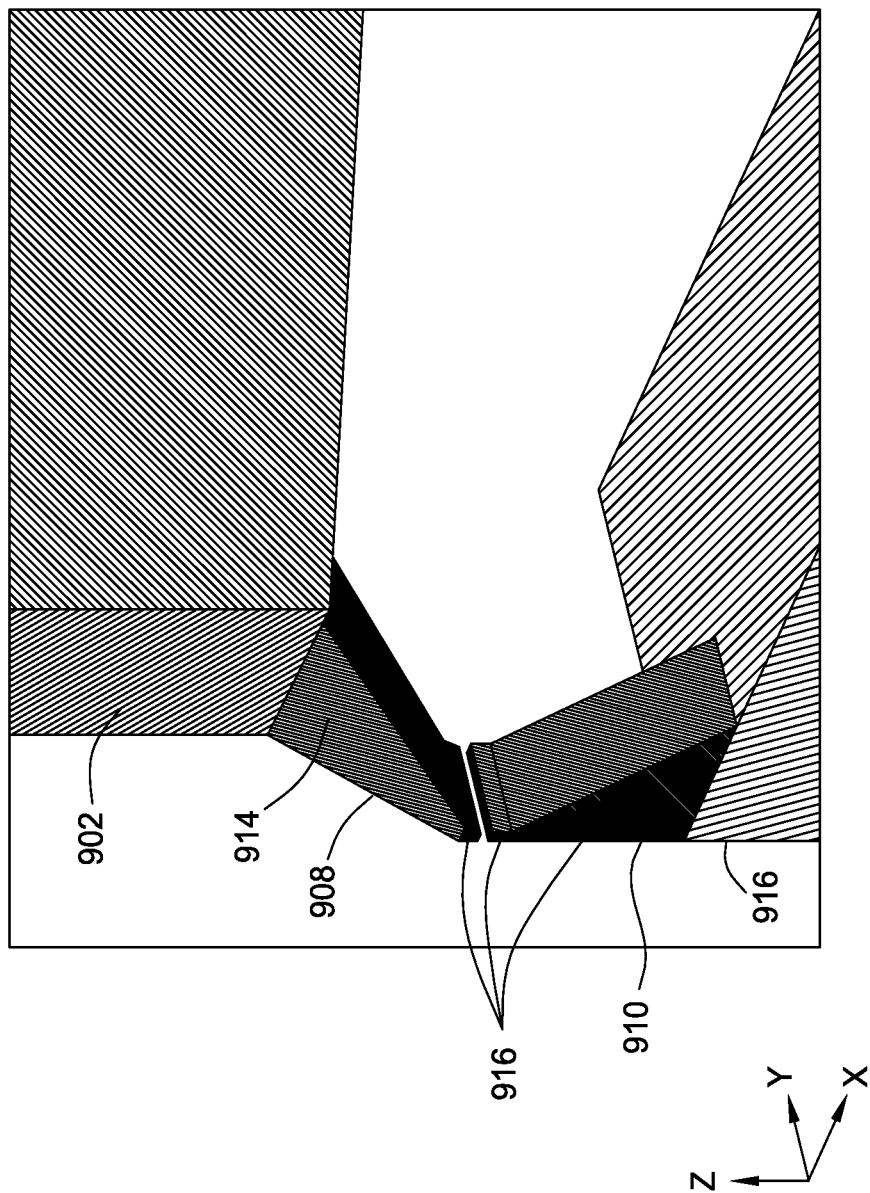
Figure 9C:
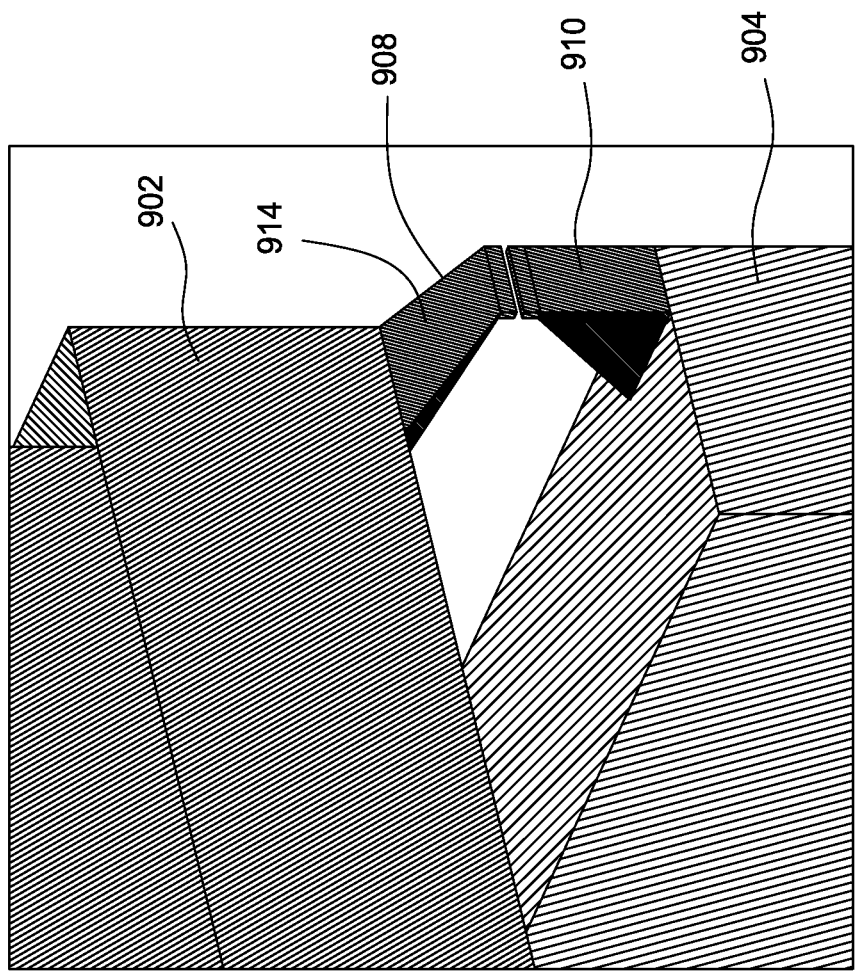

FIGS. 9A-9C are isometric views of a ring head 900 according to one embodiment. The ring head 900 includes a top yoke 902, a bottom or return yoke 904, and a back gap 906 connecting the top yoke 902 and bottom yoke 904. Pole tip 910 is the leading pole tip while pole tip 908 is the trailing pole tip. Longitudinal pole tips 908, 910 are disposed on the top yoke 902 and bottom yoke 904 respectively. The leading pole tip 910 has an optimized height relative to the down-track direction in order to maximize the field contained in the cross-track fields. It is contemplated that the leading pole tip 910 may flare cross-track to improve the flux profile. The pole tip yoke connection may flare out (i.e., have a larger angle than the pole tips themselves) to avoid flux "necking". FIG. 9B shows the trailing pole tip 908 that is coupled to the top yoke 902 to slant away from the ABS. The coils for the ring head 900 will pass between the yokes 902, 904 within the space shown by arrows 912. As can be seen from FIG. 9B, the trailing pole tip 908 is recessed back from the ABS 916 while leading pole tip 910 is at the same depth into the ring head 900 as the ABS. Similarly, yoke 902 is recessed away from the ABS 916. The ABS 916 is parallel to the Z-axis. The top yoke 902 may be recessed a distance of between about 250 nm and about 315 nm from the ABS 916 along the slanted surface 914. The trailing pole tip 908, in extending from the ABS 916 to the yoke 902, is angled at an angle of between about 10 degrees and about 25 degrees. The trailing pole tip 908 may increase in width from the ABS 916 to the yoke 902 from a width of about 200 nm to about 275 nm at the ABS 916 to a width of between about 350 nm to about 425 nm at the yoke 902.

The combination of a perpendicular exchange spring media with ring heads is beneficial because the write field of the ring head does not experience a strong loss as is the case for shielded pole heads because the pole of the ring head can be kept long (perpendicular to the medium surface) and thus the unfavorable write field scaling does not occur with ring heads. Additionally, the maximum effective write field of a ring head is very close to that of a shielded pole head if the graded exchange spring media is used. The resulting track width is considerably narrower for ring heads as compared to shielded pole heads. The write field gradient for a ring head is comparable to that of a shielded pole head. Writing with a ring head removes the need for the soft underlayer so that some sputtering stations can be freed and used for the recording and/or underlayer stack. The ring head also removes the thickness constraints for the seed layers in the media. The recording occurs at larger angles between the field and easy axis. Therefore, the perpendicular demagnetizing field is weaker and the intergranular exchange can be reduced to gain signal to noise ratio.

While the foregoing is directed to embodiments of the present invention, other and further embodiments of the invention may be devised without departing from the basic scope thereof, and the scope thereof is determined by the claims that follow.

What is claimed is:

1. A magnetic recording system, comprising:
    a perpendicular exchange spring media; and
    a ring head having an air bearing surface, wherein the ring head further comprises:
        a leading pole tip having a first surface at the air bearing surface and a second surface opposite the first surface, wherein the second surface is angled relative to the air bearing surface; and
        a trailing pole tip, wherein the trailing pole tip is slanted relative to the air bearing surface of the ring head, and wherein the air bearing surface consists essentially of the leading pole tip, the trailing pole tip, and a return yoke.

2. The magnetic recording system of claim 1, wherein the trailing pole tip is slanted at an angle of between 10 degrees and 25 degrees relative to the air bearing surface.

3. The magnetic recording system of claim 1, wherein the perpendicular exchange spring media comprises:
    a substrate;
    a first magnetic layer disposed over the substrate;
    a coupling layer disposed on the first magnetic layer;
    a second magnetic layer disposed on the first coupling layer; and
    an overcoat layer disposed on the second magnetic layer.

4. The magnetic recording system of claim 3, wherein the perpendicular exchange spring media does not have a soft underlayer disposed between the substrate and the first magnetic layer.

5. The magnetic recording system of claim 1, wherein the ring head has a top yoke, and wherein the top yoke is recessed from the air bearing surface.

6. The magnetic recording system of claim 5, wherein the trailing pole tip increases in width from the air bearing surface to the top yoke.

7. The magnetic recording system of claim 6, wherein the width increases from between about 200 nm to about 275 nm at the air bearing surface to a width of between about 350 nm and about 425 nm at the top yoke.

8. The magnetic recording system of claim 1, wherein the perpendicular exchange spring media is a graded exchange spring media.

9. A magnetic recording system, comprising:
    a perpendicular exchange spring media having:
        a substrate;
        a first magnetic layer disposed over the substrate;
        a coupling layer disposed on the first magnetic layer;
        a second magnetic layer disposed on the first coupling layer; and
        an overcoat layer disposed on the second magnetic layer; and
    a ring head having an air bearing surface, wherein the ring head further comprises:
        a leading pole tip having a first surface at the air bearing surface and a second surface opposite the first surface, wherein the second surface is angled relative to the air bearing surface; and
        a trailing pole tip, wherein the trailing pole tip is slanted relative to the air bearing surface of the ring head, and wherein the air bearing surface consists essentially of the leading pole tip, the trailing pole tip, and a return yoke.

10. The magnetic recording system of claim 9, wherein the trailing pole tip is slanted at an angle of between 10 degrees and 25 degrees relative to the air bearing surface.

11. The magnetic recording system of claim 9, wherein the ring head has a top yoke, and wherein the top yoke is recessed from the air bearing surface.

12. The magnetic recording system of claim 11, wherein the trailing pole tip increases in throat width from the air bearing surface to the top yoke.

13. The magnetic recording system of claim 12, wherein the width increases from between about 200 nm to about 275 nm at the air bearing surface to a width of between about 350 nm and about 425 nm at the top yoke.

14. The magnetic recording system of claim 9, wherein the perpendicular exchange spring media is a graded exchange spring media.

15. A magnetic recording system, comprising:
    a perpendicular graded exchange spring media; and
    a ring head having an air bearing surface, the ring head comprising:

a leading pole tip having a first surface at the air bearing surface and a second surface opposite the first surface, wherein the second surface is angled relative to the air bearing surface; and a trailing pole tip, wherein the trailing pole tip is slanted relative to the air bearing surface of the ring head, and wherein the air bearing surface consists essentially of the leading pole tip, the trailing pole tip, and a return yoke.

16. The magnetic recording system of claim 15, wherein the leading pole tip is parallel to the air bearing surface.

17. The magnetic recording system of claim 16, wherein the trailing pole tip increases in throat width from the air bearing surface to a top yoke.

18. The magnetic recording system of claim 17, wherein the trailing pole tip is slanted at an angle of between 10 degrees and 25 degrees relative to the air bearing surface.

* * * * *